United States Patent
Hu et al.

(10) Patent No.: US 12,205,341 B2
(45) Date of Patent: Jan. 21, 2025

(54) NEURAL NETWORK-BASED HIGH-RESOLUTION IMAGE RESTORATION METHOD AND SYSTEM

(71) Applicant: SOOCHOW UNIVERSITY, Suzhou (CN)

(72) Inventors: Jianling Hu, Suzhou (CN); Lihang Gao, Suzhou (CN); Dong Liao, Suzhou (CN); Jianfeng Yang, Suzhou (CN); Honglong Cao, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 390 days.

(21) Appl. No.: 17/642,137

(22) PCT Filed: Jan. 7, 2021

(86) PCT No.: PCT/CN2021/070672
§ 371 (c)(1),
(2) Date: Mar. 10, 2022

(87) PCT Pub. No.: WO2022/141660
PCT Pub. Date: Jul. 7, 2022

(65) Prior Publication Data
US 2023/0154140 A1 May 18, 2023

(30) Foreign Application Priority Data
Dec. 28, 2020 (CN) .......................... 202011606864.X

(51) Int. Cl.
*G06V 10/44* (2022.01)
*G06T 5/20* (2006.01)
*G06V 10/82* (2022.01)

(52) U.S. Cl.
CPC .............. *G06V 10/454* (2022.01); *G06T 5/20* (2013.01); *G06V 10/82* (2022.01)

(58) Field of Classification Search
CPC ......... G06V 10/454; G06V 10/82; G06T 5/20
See application file for complete search history.

(56) References Cited

FOREIGN PATENT DOCUMENTS

| CN | 106709875 A | 5/2017 |
|---|---|---|
| CN | 110276721 A | 9/2019 |

(Continued)

OTHER PUBLICATIONS

Haris, Muhammad, Gregory Shakhnarovich, and Norimichi Ukita. "Recurrent back-projection network for video super-resolution." Proceedings of the IEEE/CVF conference on computer vision and pattern recognition. 2019. (Year: 2019).*

(Continued)

*Primary Examiner* — David Perlman
(74) *Attorney, Agent, or Firm* — SZDC Law PC

(57) ABSTRACT

The present invention relates to a neural network-based high-resolution image restoration method and system, including: performing feature extraction on a target frame in a network input to obtain a first feature, performing feature extraction on a first frame and an adjacent frame and an optical flow between the first frame and the adjacent frame to obtain a second feature, and concatenating the first feature and the second feature to obtain a shallow layer feature; performing feature extraction and refinement on the shallow layer feature to obtain a plurality of output first features and a plurality of output second features; performing feature decoding on the plurality of output second features, and concatenating decoded features along channel dimensionality to obtain features; and performing weight distribution on the features to obtain final features, and restoring an image. The present invention can effectively help to improve image quality.

10 Claims, 2 Drawing Sheets

(56) References Cited

FOREIGN PATENT DOCUMENTS

| | | |
|---|---|---|
| CN | 110634105 A | 12/2019 |
| CN | 111311490 A | 6/2020 |
| CN | 111353940 A | 6/2020 |
| CN | 111507462 A | 8/2020 |
| WO | 2020206630 A1 | 10/2020 |

OTHER PUBLICATIONS

Liu, Heng, et al. "Single image super-resolution using multi-scale deep encoder-decoder with phase congruency edge map guidance." Information Sciences 473 (2019): 44-58. (Year: 2019).*

Haris, Muhammad, Gregory Shakhnarovich, and Norimichi Ukita. "Deep back-projection networks for super-resolution." Proceedings of the IEEE conference on computer vision and pattern recognition. 2018. (Year: 2018).*

* cited by examiner performing feature extraction on a target frame in a network input to obtain a first feature, performing feature extraction on a first frame and an adjacent frame of the first frame and an optical flow between the first frame and the adjacent frame to obtain a second feature, and concatenating the first feature and the second feature to obtain a shallow layer feature performing feature extraction and refinement on the shallow layer feature by using an iterative up and down sampling method to obtain a plurality of output first features and a plurality of output second features performing feature decoding on the plurality of output second features, and concatenating decoded features along channel dimension to obtain features after a plurality of concatenation performing weight distribution on the features after the plurality of concatenation to obtain final features, and restoring an image by using the final features

FIG. 1

NEURAL NETWORK-BASED HIGH-RESOLUTION IMAGE RESTORATION METHOD AND SYSTEM

This application is the National Stage Application of PCT/CN2021/070672, filed on Jan. 7, 2021, which claims priority to Chinse patent application No. 202011606864.X, filed on Dec. 28, 2020, which is incorporated by reference for all purposes as if fully set forth herein.

FIELD OF THE INVENTION

The present invention relates to the field of image restoration technologies, and more particularly to a neural network-based high-resolution image restoration method and system.

DESCRIPTION OF THE RELATED ART

In modern life, the need for high-resolution images is very common, and high-resolution images or videos are required in a number of fields such as security surveillance, medical imaging, target detection, and face recognition. In a high-resolution image restoration technique, a corresponding high-resolution image is generated by using a low-resolution image as an input without other information, and the technique receives positive subjective and objective evaluation. For example, in an interpolation algorithm in a conventional method, the resolution of an image can be effectively improved by interpolation operation. However, the interpolation algorithm receives rather negative subjective and objective evaluation.

SUMMARY OF THE INVENTION

For this, a technical problem to be resolved by the present invention is to overcome the problem of rather negative subjective and objective evaluation because a high-resolution image restoration method in the prior art is complex, to provide a neural network-based high-resolution image restoration method and system that are simple and can improve the quality of a low-resolution image.

To solve the foregoing technical problems, the present invention provides a neural network-based high-resolution image restoration method, and the method includes: performing feature extraction on a target frame in a network input to obtain a first feature, performing feature extraction on a first frame and an adjacent frame of the first frame and an optical flow between the first frame and the adjacent frame to obtain a second feature, and concatenating the first feature and the second feature to obtain a shallow layer feature; performing feature extraction and refinement on the shallow layer feature by using an iterative up and down sampling method to obtain a plurality of output first features and a plurality of output second features; performing feature decoding on the plurality of output second features, and concatenating decoded features along channel dimension to obtain features after a plurality concatenation; and performing weight distribution on the features after the plurality of concatenation to obtain final features, and restoring an image by using the final features.

In an embodiment of the present invention, during feature extraction of the target frame in the network input, feature extraction is performed on the target frame by using one or two convolutional layers to obtain the first feature; and during feature extraction of the first frame and an adjacent frame of the first frame and the optical flow between the first frame and the adjacent frame, feature extraction is performed on the first frame, a dense optical flow between the first frame and a second frame, and the second frame in a low-resolution image sequence by using one or two convolutional layers.

In an embodiment of the present invention, a determination method of performing feature extraction and refinement on the shallow layer feature by using an iterative up and down sampling method comprises: determining whether there are uncalculated adjacent frames in the shallow layer feature, where if yes, feature concatenation is performed on one obtained output first feature and a feature of an optical flow between a next frame and an adjacent frame of the next frame for use as an input for next iteration, and cyclic iteration is performed until all input frames have been calculated; or if not, the process enters Step S3.

In an embodiment of the present invention, during the iterative up and down sampling, a process of a single iteration up and down sampling includes: a first convolutional layer, a first deconvolutional layer, a second convolutional layer, a second deconvolutional layer, a third convolutional layer, and a third deconvolutional layer.

In an embodiment of the present invention, the first convolutional layer and the first deconvolutional layer use the same convolution kernel, step size, and channel quantity; the second convolutional layer and the second deconvolutional layer use the same convolution kernel, step size, and channel quantity; and the third convolutional layer and the third deconvolutional layer use the same convolution kernel, step size, and channel quantity.

In an embodiment of the present invention, an input of the first convolutional layer is the shallow layer feature, an input of the first deconvolutional layer is a result of the first convolutional layer, an input of the second convolutional layer is a difference between a result of the first deconvolutional layer and the shallow layer feature, an input of the second deconvolutional layer is a result of the second convolutional layer, an input of the third convolutional layer is a result of the second deconvolutional layer, and an input of the third deconvolutional layer is a difference between a result of the third convolutional layer and the result of the second deconvolutional layer.

In an embodiment of the present invention, the number of iterative up and down sampling process is adjusted according to a requirement of a network scale.

In an embodiment of the present invention, during the iterative up and down sampling, an output second feature obtained from each iteration is saved.

In an embodiment of the present invention, during restoration of the image by using the final features, one or two convolutional layers are used.

The present invention further provides a neural network-based high-resolution image restoration system, including: a feature extraction module, configured to: perform feature extraction on a target frame in a network input to obtain a first feature, perform feature extraction on a first frame and an adjacent frame of the first frame and an optical flow between the first frame and the adjacent frame of the first frame to obtain a second feature, and concatenate the first feature and the second feature to obtain a shallow layer feature; an encoding and decoding module, configured to perform feature extraction and refinement on the shallow layer feature by using an iterative up and down sampling method to obtain a plurality of output first features and a plurality of output second features; an encoding module, configured to: perform feature decoding on the plurality of output second features, and concatenate decoded features along channel dimensionality to obtain features after a plurality of concatenation; and a weight distribution module and a restoration module, configured to: perform weight distribution on the features after the plurality of concatenation to obtain final features, and restore an image by using the final features.

Compared with the prior art, the foregoing technical solutions of the present invention has the following advantages:

For the neural network-based high-resolution image restoration method and system of the present invention, feature extraction is performed on a target frame in a network input to obtain a first feature, and feature extraction is performed on a first frame and an adjacent frame of the first frame and an optical flow between the first frame and an adjacent frame to obtain a second feature, it not only implement initial feature fitting, but also adjust the scale of a network, so that the size of the network parameter scan be controlled. The first feature and the second feature are concatenated to obtain a shallow layer feature, to facilitate feature extraction and refinement of features. Feature extraction and refinement are performed on the shallow layer feature by using an iterative up and down sampling method to obtain a plurality of output first features and a plurality of output second features, so that key features of an inputted image can be adequately kept, to avoid a vanishing gradient case during training. Feature decoding is performed on the plurality of output second features, and decoded features are concatenated along channel dimensionality to obtain features after a plurality of concatenation. Weight distribution is performed on the features after the plurality of concatenation to obtain final features, and an image is restored by using the final features. Because different frames have different distances from the target frame and contribute differently to reconstructed information, the step can effectively help to improve image quality.

BRIEF DESCRIPTION OF THE DRAWINGS

To make the content of the present invention clearer and more comprehensible, the present invention is further described in detail below according to specific embodiments of the present invention and the accompanying draws. Where:

FIG. 1 is a flowchart of a neural network-based high-resolution image restoration method according to the present invention;

DETAILED DESCRIPTION OF THE PREFERRED EMBODIMENTS

Embodiment 1

Figure 2:
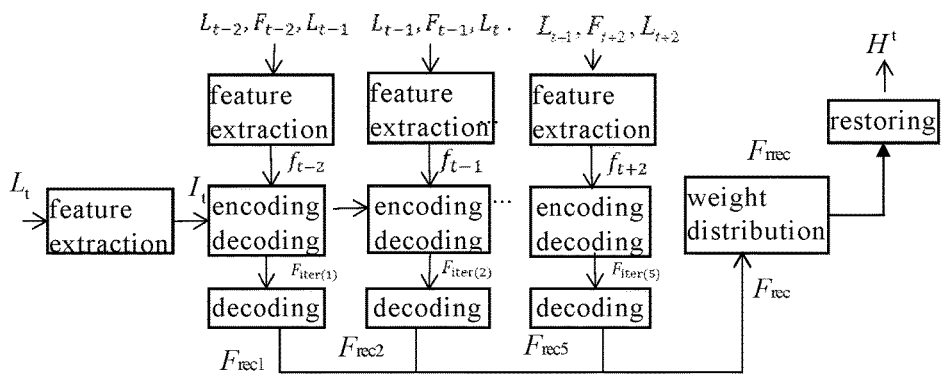
FIG. 2 is a schematic diagram of a neural network-based high-resolution image restoration system according to the present invention.

As shown in FIG. 1, this embodiment provides a neural network-based high-resolution image restoration method, including: Step S1: performing feature extraction on a target frame in a network input to obtain a first feature, performing feature extraction on a first frame and an adjacent frame of the first frame and an optical flow between the first frame and the adjacent frame to obtain a second feature, and concatenating the first feature and the second feature to obtain a shallow layer feature; Step S2: performing feature extraction and refinement on the shallow layer feature by using an iterative up and down sampling method to obtain a plurality of output first features and a plurality of output second features; Step S3: performing feature decoding on the plurality of output second features, and concatenating decoded features along channel dimension to obtain features after a plurality of concatenation; and Step S4: performing weight distribution on the features after the plurality of concatenation to obtain final features, and restoring an image by using the final features.

For the neural network-based high-resolution image restoration method in this embodiment, in Step S1, feature extraction is performed on a target frame in a network input to obtain a first feature, and feature extraction is performed on a first frame and an adjacent frame of the first frame and an optical flow between the first frame and the adjacent frame to obtain a second feature, it not only implement initial feature fitting, but also adjust the scale of a network, so that the size of the network parameters can be controlled. The first feature and the second feature are concatenated to obtain a shallow layer feature, to facilitate feature extraction and refinement of features. In Step S2, feature extraction and refinement are performed on the shallow layer feature by using an iterative up and down sampling method to obtain a plurality of output first features and a plurality of output second features, so that key features of an inputted image can be adequately kept, to avoid a vanishing gradient case during training. In Step S3, feature decoding is performed on the plurality of output second features, and decoded features are concatenated along channel dimensionality to obtain features after a plurality of concatenation. In Step S4, weight distribution is performed on the features after the plurality of concatenation to obtain final features, and an image is restored by using the final features. Because different frames have different distances from the target frame and contribute differently to reconstructed information, the step can effectively help to improve image quality.

In Step S1, during feature extraction of the target frame in the network input, shallow layer feature extraction is performed on the target frame by using one or two convolutional layers to obtain the first feature; and during feature extraction of the first frame and an adjacent frame of the first frame and the optical flow between the first frame and the adjacent frame, feature extraction is performed on the first frame, a dense optical flow between the first frame and a second frame, and the second frame in a low-resolution image sequence by using one or two convolutional layers.

As shown in FIG. 2, shallow layer feature extraction is respectively performed on a target frame $L_t$ and a first frame and a dense optical flow between the first frame and a second frame and the second frame [$L_{t-2}$, $F_{t-2}$, $L_{t-1}$] in a low-resolution image sequence by using one or two convolutional layers, to respectively obtain a first feature $I_t$ and a second feature $f_{t-2}$.

The first feature $I_t$ and the second feature $f_{t-2}$ are concatenated to obtain a shallow layer feature $F_{conv(i), i=1}$. (i denotes a quantity of iteration).

The target frame is a middle frame in the network input. In this embodiment, five frames are used as an example, and the middle frame is used as the target frame.

In Step S2, a determination method of performing feature extraction and refinement on the shallow layer feature by using an iterative up and down sampling method comprising: determining whether there are uncalculated adjacent frames in the shallow layer feature, where if yes, feature concatenation is performed on one obtained output first feature and a next frame and a feature of an optical flow between the next frame and an adjacent frame of the next frame for use as an input for a next iteration, and cyclic iteration is performed until all input frames have been calculated; or if not, the process enters Step S4.

It is determined whether there are uncalculated adjacent frames in the shallow layer feature. If yes, feature concatenation is performed on one obtained output first feature and a next frame and a feature of an optical flow between the next frame and an adjacent frame of the next frame. Let i=i+1. Feature extraction is performed again on the concatenated feature to obtain a new feature. The new feature is used as an input to continue to perform iterative up and down sampling again to extract a feature. The cycle is repeated until all input frames have been calculated.

The iterative up and down sampling method includes a plurality of groups of upsampling modules and downsampling modules, and cross layer connections are used.

Figure 3:
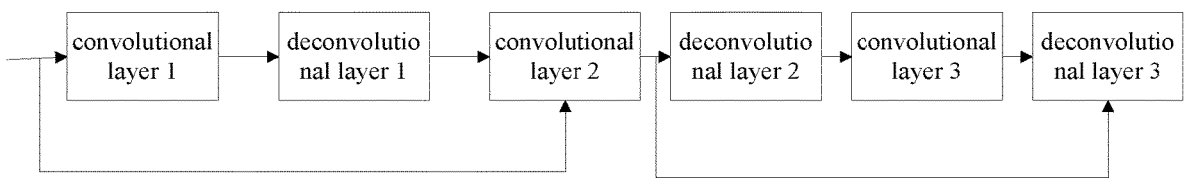
FIG. 3 is a schematic diagram of a process of a single iteration up and down sampling according to the present invention.

As shown in FIG. 3, during the iterative up and down sampling process, a process of a single iteration up and down sampling includes: a first convolutional layer, a first deconvolutional layer, a second convolutional layer, a second deconvolutional layer, a third convolutional layer, and a third deconvolutional layer.

the first convolutional layer and the first deconvolutional layer use the same convolution kernel, step size, and channel quantity; the second convolutional layer and the second deconvolutional layer use the same convolution kernel, step size, and channel quantity; and the third convolutional layer and the third deconvolutional layer use the same convolution kernel, step size, and channel quantity.

An input of the first convolutional layer is the shallow layer feature, an input of the first deconvolutional layer is a result of the first convolutional layer, an input of the second convolutional layer is a difference between a result of the first deconvolutional layer and the shallow layer feature, an input of the second deconvolutional layer is a result of the second convolutional layer, an input of the third convolutional layer is a result of the second deconvolutional layer, and an input of the third deconvolutional layer is a difference between a result of the third convolutional layer and the result of the second deconvolutional layer.

The number of iterative up and down sampling process is adjusted according to a requirement of a network scale.

In Step S3, feature decoding is performed on the plurality of output second features $F_{iter}(i)$, and decoded features and decoded features in a previous cycle $F_{iter}(i)$ are concatenated along channel dimensionality to finally obtain features $F_{rec}$ after a plurality of concatenation.

In Step S4, because different frames have different distances from the target frame and contribute differently to reconstructed information, weight redistribution is performed on $F_{rec}$ to obtain $F_{rrec}$. During restoration of the image by using the final features, one or two convolutional layers are used. $F_{rrec}$ is used to continue to perform image restoration to obtain a final target frame.

In the present application, during processing of adjacent frames and an optical flow between the adjacent frames, dense optical flow extraction is first performed on inputted consecutive frames of image. It is assumed that the inputted consecutive frames of image are $[L_{t-(k-1)/2} \ldots L_{t-2}, L_{t-1}, L_t, L_{t+1}, L_{t+2}, L_{t+(k-1)/2}]$, where a quantity of the frames is k(k=2i+1, i=1, 2, 3 . . . ).

Data after dense optical flows are extracted is:

$[L_{t-(k-1)/2} \ldots L_{t-2}, F_{t-2}, L_{t-1}, F_{t-1}, L_t, F_{t+1}, L_{t+1}, F_{t+2}, L_{t+2} \ldots L_{t+(k-1)/2}]$, where $L_t$ denotes a low-resolution frame, and $F_t$ denotes a dense optical flow between adjacent frames. Generally, during processing of an input of a plurality of consecutive frames, a recurrent neural network (RNN) is often used. Therefore, the RNN can adequately extract temporal and spatial information of adjacent frames of image, so that sequence information can be adequately processed. In the present invention, an RNN structure is not used. However, a characteristic of processing sequence information is kept.

Embodiment 2

This embodiment provides a neural network-based high-resolution image restoration system. An image is restored based on the neural network-based high-resolution image restoration method in Embodiment 1, and the principle of the system is the same as that of the method.

The neural network-based high-resolution image restoration system includes: a feature extraction module, configured to: perform feature extraction on a target frame in a network input to obtain a first feature, perform feature extraction on a first frame and an adjacent frame of the first frame and an optical flow between the first frame and the adjacent frame to obtain a second feature, and concatenate the first feature and the second feature to obtain a shallow layer feature; an encoding and decoding module, configured to perform feature extraction and refinement on the shallow layer feature by using an iterative up and down sampling method to obtain a plurality of output first features and a plurality of output second features; an encoding module, configured to: perform feature decoding on the plurality of output second features, and concatenate decoded features along channel dimensionality to obtain features after a plurality of concatenation; and a weight distribution module and a restoration module, configured to: perform weight distribution on the features after the plurality of concatenation to obtain final features, and restore an image by using the final features.

The feature extraction module is configured to: perform initial feature filtering on inputted low-resolution images, and extract a relatively small number of features to prepare for encoding. A convolutional layer is used to complete the part. Through feature extraction, initial feature fitting can be implemented, and in addition the scale of a network can be adjusted, so that a parameter amount of the network can be controlled.

The encoding and decoding module, that is, an iterative up and down sampling module, mainly uses the structure of a convolutional layer, a deconvolutional layer, and a residual network, and the residual network has adequate transferability, so that key features of an inputted image can be adequately kept, to avoid a vanishing gradient case during training. Each encoding and decoding module includes an additional input and previously trained results, so that time domain information can be fully utilized, and information of each frame is fully utilized. This is used as additional information, which helps to restore a high-resolution current frame of image. The encoding and decoding module first scales up an image, then scales down the image, and then scales up the image, and up and down iteration is continuously performed, to better learn network parameters. This process is a feedback process of the network. Different from most network structures with only feedforward, feedback can better extract image features.

As shown in FIG. 2, specifically, a process of iterative up and down sampling includes six convolutional layers. The process includes: a convolutional layer 1, a deconvolutional layer 1, a convolutional layer 2, a deconvolutional layer 2, a convolutional layer 3, and a deconvolutional layer 3. Each convolutional layer and each deconvolutional layer use the same convolution kernel, step size, and channel quantity. An input of the convolutional layer 1 is the shallow layer feature. An input of the deconvolutional layer 1 is a result of the convolutional layer 1. An input of the convolutional layer 2 is a difference between a result of the deconvolutional layer 1 and the shallow layer feature. An input of the deconvolutional layer 2 is a result of the convolutional layer 2. An input of the convolutional layer 3 is a result of the deconvolutional layer 2. An input of the deconvolutional layer 3 is a difference between a result of the convolutional layer 3 and the result of the deconvolutional layer 2.

The process of encoding and decoding may include two or three times of iteration. A specific quantity may be adjusted according to a requirement of a network scale, that is, an operation time.

In the encoding module, corresponding to each encoding and decoding module, the structure of each encoding and decoding module needs to contribute to the final reconstruction, thereby providing valid information. Therefore, each encoding and decoding training module is accompanied with a further decoding module, and the module is formed by deconvolutional layers, thereby fully extracting information obtained through training of the encoding and decoding module.

The weight distribution module and the restoration module, final features $F_{rec}$ extracted by the network are obtained after decoding and concatenating. The weight distribution module performs weight redistribution on previously obtained $F_{rec}$ to obtain $F_{rrec}$, so that interference information such as artifacts can be adequately eliminated. The restoration module is completed by using a deconvolutional layer, and a final restored image is obtained by using $F_{rrec}$.

A main scenario of the present invention is a case of shooting pictures from a long distance. If the distance is excessively long, a pixel area occupied by a target tends to be relatively small, and problems such as light and lens shake are all likely to cause blur in images. A few frames in a lens are obtained through sampling within a short period of time as an actual input to the network, to obtain a high-resolution image output. During use, a high-resolution image can be obtained very conveniently by using a plurality of consecutive images as an input to the network. During the training of the network, a plurality of low-resolution images and a single high-resolution image are used as image pairs, that is, $Ht-[L_{t-(k-1)/2} \ldots L_{t-2}, L_{t-1}, L_t, L_{t+1}, L_{t+2} \ldots L_{t+(k-1)/2}]$. The plurality of low-resolution images and dense optical flows between the plurality of low-resolution images are used as inputs to the network, so that it is obtained that an output of the network is $H_t$. $S_t$ and $H_t$ form a loss of network training. An objective of the network is to reduce a loss value dominated by a loss, to update parameters, thereby obtaining a better result. The network uses an optimizer Adam, and an initial learning rate is set to 0.0001.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including, but not limited to a disk memory, a compact disc read-only memory (CD-ROM), an optical memory, and the like) that include computer usable program code.

The present application is described with reference to the flowcharts and/or block diagrams of a method, a device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A neural network-based high-resolution image restoration method, comprising steps of:
   Step S1: performing feature extraction on a target frame in a network input to obtain a first feature, performing feature extraction on a first frame and an adjacent frame of the first frame and an optical flow between the first frame and the adjacent frame to obtain a second feature, and concatenating the first feature and the second feature to obtain a shallow layer feature, implementing initial feature fitting and adjusting a scale of a network;
   Step S2: performing feature extraction and refinement on the shallow layer feature by using an iterative up and down sampling method to obtain a plurality of output first features and a plurality of output second features;
   Step S3: performing feature decoding on the plurality of output second features, and concatenating decoded features along channel dimension to obtain features after a plurality of concatenation; and Step S4: performing weight distribution on the features after the plurality of concatenation to obtain final features, and restoring an image by using the final features, wherein the Step S1, Step S2, Step S3, and Step S4 effectively improve image quality.

2. The neural network-based high-resolution image restoration method according to claim 1, wherein during feature extraction of the target frame in the network input, feature extraction is performed on the target frame by using one or two convolutional layers to obtain the first feature; and during feature extraction of the first frame and an adjacent frame of the first frame and the optical flow between the first frame and the adjacent frame, feature extraction is performed on the first frame, a dense optical flow between the first frame and a second frame, and the second frame in a low-resolution image sequence by using one or two convolutional layers.

3. The neural network-based high-resolution image restoration method according to claim 1, wherein a determination method of performing feature extraction and refinement on the shallow layer feature by using an iterative up and down sampling method comprises: determining whether there are uncalculated adjacent frames in the shallow layer feature, wherein if yes, feature concatenation is performed on one obtained output first feature and a feature of an optical flow between a next frame and an adjacent frame of the next frame for use as an input for next iteration, and cyclic iteration is performed until all input frames have been calculated; or if not, the process enters Step S3.

4. The neural network-based high-resolution image restoration method according to claim 1, wherein during the iterative up and down sampling process, a process of a single iterative up and down sampling comprises: a first convolutional layer, a first deconvolutional layer, a second convolutional layer, a second deconvolutional layer, a third convolutional layer, and a third deconvolutional layer.

5. The neural network-based high-resolution image restoration method according to claim 4, wherein the first convolutional layer and the first deconvolutional layer use the same convolution kernel, step size, and channel quantity; the second convolutional layer and the second deconvolutional layer use the same convolution kernel, step size, and channel quantity; and the third convolutional layer and the third deconvolutional layer use the same convolution kernel, step size, and channel quantity.

6. The neural network-based high-resolution image restoration method according to claim 4, wherein an input of the first convolutional layer is the shallow layer feature, an input of the first deconvolutional layer is a result of the first convolutional layer, an input of the second convolutional layer is a difference between a result of the first deconvolutional layer and the shallow layer feature, an input of the second deconvolutional layer is a result of the second convolutional layer, an input of the third convolutional layer is a result of the second deconvolutional layer, and an input of the third deconvolutional layer is a difference between a result of the third convolutional layer and the result of the second deconvolutional layer.

7. The neural network-based high-resolution image restoration method according to claim 1, wherein the number of iterative up and down sampling process is adjusted according to a requirement of a network scale.

8. The neural network-based high-resolution image restoration method according to claim 3, wherein during the iterative up and down sampling process, an output second feature obtained from each iteration is saved.

9. The neural network-based high-resolution image restoration method according to claim 1, wherein during restoration of the image by using the final features, one or two convolutional layers are used.

10. A neural network-based high-resolution image restoration system, comprising:
a feature extraction module, configured to: perform feature extraction on a target frame in a network input to obtain a first feature, perform feature extraction on a first frame and an adjacent frame of the first frame and an optical flow between the first frame and the adjacent frame to obtain a second feature, concatenate the first feature and the second feature to obtain a shallow layer feature, and implement initial feature fitting and adjust a scale of the network;
an encoding and decoding module, configured to perform feature extraction and refinement on the shallow layer feature by using an iterative up and down sampling method to obtain a plurality of output first features and a plurality of output second features;
an encoding module, configured to: perform feature decoding on the plurality of output second features, and concatenate decoded features along channel dimensionality to obtain features after a plurality of concatenation; and
a weight distribution module and a restoration module, configured to: perform weight distribution on the features after the plurality of concatenation to obtain final features, and restore an image by using the final features,
wherein the neural network-based high-resolution image restoration system effectively improve image quality.

* * * * *